US010832083B1

(12) United States Patent
Givental et al.

(10) Patent No.: US 10,832,083 B1
(45) Date of Patent: Nov. 10, 2020

(54) ADVANCED IMAGE RECOGNITION FOR THREAT DISPOSITION SCORING

(71) Applicant: International Business Machines Corporation, Armonk, NY (US)

(72) Inventors: Gary I. Givental, Bloomfield Hills, MI (US); Wesley A. Khademi, Costa Mesa, CA (US); Aankur Bhatia, Bethpage, NY (US); Srinivas B. Tummalapenta, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/391,485

(22) Filed: Apr. 23, 2019

(51) Int. Cl.
*G06K 9/62* (2006.01)
*G06K 9/00* (2006.01)
*G06N 3/08* (2006.01)
*G08B 13/194* (2006.01)

(52) U.S. Cl.
CPC ....... *G06K 9/6202* (2013.01); *G06K 9/00771* (2013.01); *G06K 9/6267* (2013.01); *G06N 3/088* (2013.01); *G08B 13/194* (2013.01)

(58) Field of Classification Search
CPC ............. G06K 9/6202; G06K 9/00771; G06K 9/6267; G06N 3/088; G08B 13/194
See application file for complete search history.

(56) References Cited

U.S. PATENT DOCUMENTS 7,809,722 B2 10/2010 Gokturj et al.
10,348,762 B2 * 7/2019 Sites ..................... G06F 21/552
10,424,048 B1 * 9/2019 Calhoun ................. G06T 5/003
10,691,795 B2 * 6/2020 Lim ..................... G06N 3/0481
2004/0199531 A1 10/2004 Kim et al.
(Continued)

FOREIGN PATENT DOCUMENTS

CN 106790256 A 5/2017

OTHER PUBLICATIONS

Yang, Xiaodong, Pavlo Molchanov, and Jan Kautz. "Multilayer and multimodal fusion of deep neural networks for video classification." Proceedings of the 24th ACM international conference on Multimedia. 2016. (Year: 2016).*

(Continued)

*Primary Examiner* — Utpal D Shah
(74) *Attorney, Agent, or Firm* — Stephen J. Walden, Jr.; Jeffrey S. LaBaw

(57) ABSTRACT

Mechanisms are provided to implement an image based event classification engine having an event image encoder and a first neural network computer model. The event image encoder receives an event data structure comprising a plurality of event attributes, where the event data structure represents an event occurring in association with a computing resource. The event image encoder executes, for each event attribute, a corresponding event attribute encoder that encodes the event attribute as a pixel pattern in a predetermined grid of pixels, corresponding to the event attribute, of an event image. The event image is into to a neural network computer model which applies one or more image feature extraction operations and image feature analysis algorithms to the event image to generate a classification prediction classifying the event into one of a plurality of predefined classifications and outputs the classification prediction.

20 Claims, 11 Drawing Sheets

(56) References Cited

U.S. PATENT DOCUMENTS

| | | |
|---|---|---|
| 2011/0041179 A1 | 2/2011 | Stahlberg |
| 2013/0321623 A1* | 12/2013 | Roskowski .............. H04N 7/18 348/143 |
| 2015/0163242 A1* | 6/2015 | Laidlaw ................ G06N 7/023 726/22 |
| 2017/0091459 A1 | 3/2017 | Childress |
| 2018/0018508 A1* | 1/2018 | Tusch ................ G06K 9/00771 |
| 2019/0304102 A1* | 10/2019 | Chen .................... G06K 9/6271 |
| 2020/0234468 A1* | 7/2020 | Lerchner ................ G06N 3/084 |

OTHER PUBLICATIONS

Kapur, Jyotika et al., "Security using image processing", International Journal of Managing Information Technology (JMIT) vol. 5, No. 2, May 2013, pp. 13-21.

Shi, Yun Q., "Some Publications and Patents on Data Hiding, Steganalysis, Forensics and Security", Dec. 25, 2008, 11 pages.

\* cited by examiner

| |
|---|
| REMEDY CUSTOMER ID |
| INDUSTRY IDENTIFIER |
| QRADAR RULE NAME/QRADAR RULE NAME COUNT/ISQRALERT |
| ALERT SCORE QSEVERITY/MAGNITUDE |
| EVENT COUNT/RULE FIRE COUNT |
| SRC GEO/SRC GEO COUNT |
| DST GEO/DST GEO COUNT |
| EVENT NAMES/EVENT NAMES COUNT |
| EVENT VENDORS |
| EVENT GROUPS/EVENT GROUPS COUNT |
| SRC IP INTERNAL COUNT/DST IP INTERNAL COUNT |
| SRC IP EXTERNAL COUNT/DST IP EXTERNAL COUNT |
| SRC IP CRITICAL COUNT/DST IP CRITICAL COUNT |
| SRC IP PROXY COUNT/DST IP PROXY COUNT |
| SRC IP ACCEPTABLE TRAFFIC COUNT/DST IP ACCEPTABLE TRAFFIC COUNT |
| SRC IP SUSPICIOUS HOST COUNT/DST IP SUSPICIOUS HOST COUNT |
| ATTACK DURATION |
| ALERT CREATION TIME |

FIG. 2A

ADVANCED IMAGE RECOGNITION FOR THREAT DISPOSITION SCORING

BACKGROUND

The present application relates generally to an improved data processing apparatus and method and more specifically to mechanisms for performing advanced image recognition to identify and score threats to computing system resources.

Security intelligence event monitoring (SIEM) is an approach to security management that combines security information management with security event monitoring functions into a single security management system. A SIEM system aggregates data from various data sources in order to identify deviations in the operation of the computing devices associated with these data sources from a normal operational state and then take appropriate responsive actions to the identified deviations. SIEM systems may utilize multiple collection agents that gather security related events from computing devices, network equipment, firewalls, intrusion prevention systems, antivirus systems, and the like. The collection agents may then send this information, or a subset of this information that has been preprocessed to identify only certain events for forwarding, to a centralized management console where security analysts examine the collected event data and prioritize events as to their security threats for appropriate responsive actions. The responsive actions may take many different forms, such as generating alert notifications, inhibiting operation of particular computer components, or the like.

IBM® QRadar® Security Intelligence Platform, available from International Business Machines (IBM) Corporation of Armonk, N.Y., is an example of one SIEM system which is designed to detect well-orchestrated, stealthy attacks as they are occurring and immediately set off the alarms before any data is lost. By correlating current and historical security information, the IBM® QRadar® Security Intelligence Platform solution is able to identify indicators of advanced threats that would otherwise go unnoticed until it is too late. Events related to the same incident are automatically chained together, providing security teams with a single view into the broader threat. With QRadar®, security analysts can discover advanced attacks earlier in the attack cycle, easily view all relevant events in one place, and quickly and accurately formulate a response plan to block advanced attackers before damage is done.

In many SIEM systems, the SIEM operations are implemented using SIEM rules that perform tests on computing system events, data flows, or offenses, which are then correlated at a central management console system. If all the conditions of a rule test are met, the rule generates a response. This response typically results in an offense or incident being declared and investigated.

Currently, SIEM rules are created, tested, and applied to a system manually and sourced from out of the box rules (base set of rules that come with a SIEM system), use case library rules ("template" rules provided by provider that are organized by category, e.g., NIST, Industry, etc.), custom rules (rules that are manually developed based on individual requirements), and emerging thread rules (manually generated rules derived from a "knee jerk" reaction to an emerging thread or an attack). All of these rules must be manually created, tested and constantly reviewed as part of a rule life-cycle. The life-cycle determines if the rule is still valid, still works, and still applies. Furthermore, the work involved in rule management does not scale across different customer SIEM systems due to differences in customer industries, customer systems, log sources, and network topology.

SIEM rules require constant tuning and upkeep as new systems come online, new software releases are deployed, and new vulnerabilities are discovered. Moreover, security personnel can only create SIEM rules to detect threats that they already know about. SIEM rules are not a good defense against "Zero Day" threats and other threats unknown to the security community at large.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions which are executed by the at least one processor and specifically configure the at least one processor to implement an image based event classification engine comprising an event image encoder and a first neural network computer model. The method comprises receiving, by the event image encoder, an event data structure comprising a plurality of event attributes. The event data structure represents an event occurring in association with at least one computing resource in a monitored computing environment. The method further comprises executing, by the event image encoder, for each event attribute in the plurality of event attributes, a corresponding event attribute encoder that encodes the event attribute as a pixel pattern in a predetermined grid of pixels, corresponding to the event attribute, of an event image representation data structure. In addition, the method comprises inputting, into the first neural network computer model, the event image representation data structure, and processing, by the first neural network computer model, the event image representation data structure by applying one or more image feature extraction operations and image feature analysis algorithms to the event image representation data structure to generate a classification prediction output classifying the event into one of a plurality of predefined classifications. Moreover, the method comprises outputting, by the first neural network computer model, a classification output indicating a prediction of one of the predefined classifications that applies to the event.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2A is an example diagram illustrating a data layout of extracted security alert attributes for a security alert that may be generated by the IBM® QRadar® Security Intelligence Platform in accordance with one illustrative embodiment;

DETAILED DESCRIPTION

Figure 1A:
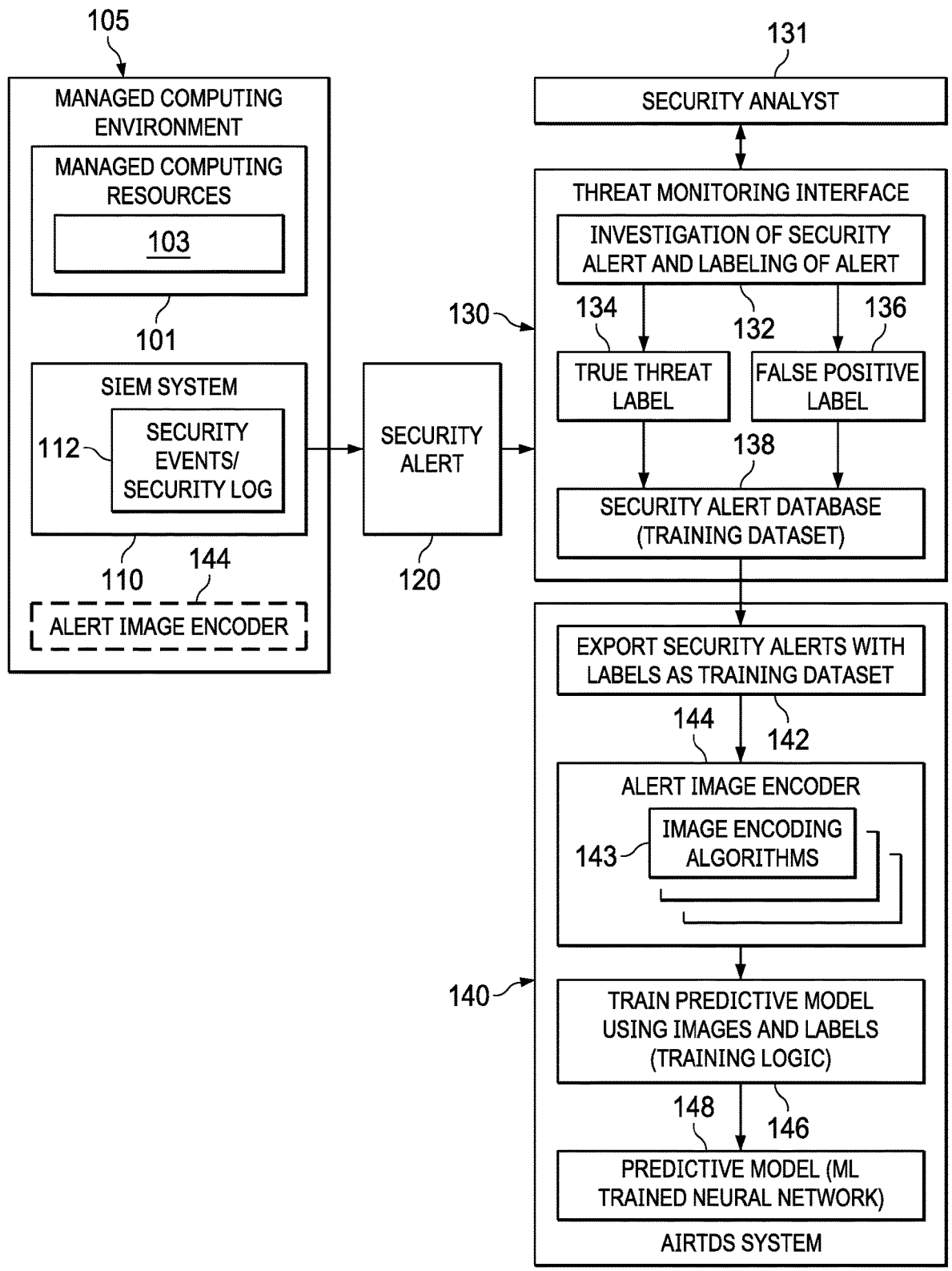
FIG. 1A is an example diagram illustrating the primary operational elements for a training phase of an advanced image recognition for threat disposition scoring (AIRTDS) computing system, and a workflow of these primary operational elements, in accordance with one illustrative embodiment.

Mechanisms are provided that process alerts (or offenses), such as those that may be generated by a security intelligence event monitoring (SIEM) system and/or stored in constituent endpoint logs, and encode them into an image that is then processed by a trained image recognition system to classify the alerts (or offenses) as to whether or not they are true threats or false positives. In performing the transformation of alerts into an image, the mechanisms of the illustrative embodiments utilize one or more transformation algorithms to transform or encode one or more of the alert attributes into corresponding portions of an image at a specified location and with image features, that correspond to the content of the alert attribute. Different alert attributes may be transformed or encoded into different sections of the image, with the transformation or encoding specifically designed to generate a human visible pattern which is recognizable by the human eye as a visual pattern, but may not necessarily be human understandable as to what the pattern itself represents. In other words, the image recognition system is able to understand the meaning behind the encoded image corresponding to the alert, while the human user may recognize the visual pattern as being a pattern, but not know the meaning of the pattern in the way that the image recognition system is able to understand the meaning.

It should be appreciated that while the primary illustrative embodiments described herein will make reference specifically to SIEM systems and SIEM alerts or offenses, the illustrative embodiments are not limited to such. Rather, the mechanisms of the illustrative embodiments may be implemented with any computer data analytics systems which generate events or log occurrences of situations for which classification of the events or logged entries may be performed to evaluate the veracity of the event or logged entry. For ease of explanation of the illustrative embodiments, and to illustrate the applicability of the present invention to security data analytics, the description of the illustrative embodiments set forth herein will assume a SIEM system based implementation, but again should not be construed as being limited to such.

As noted previously, data analytics systems, such as a security intelligence event monitoring (SIEM) computing system operates based on a set of SIEM rules which tend to be static in nature. That is, the SIEM rules employed by a SIEM computing system to identify potential threats to computing resources and then generate alerts/log entries are often generated manually and in response to known threats, rather than automatically and in a proactive manner. As a result, such data analytics systems struggle to keep up with the ever-changing security landscape. That is, as these systems are primarily rule driven, security experts constantly have to modify and manage the SIEM rules in order to keep up with new threats.

Often the SIEM computing systems suffer from a vast number of false-positive alerts they generate, causing a large amount of manual effort for security analysts and experts to investigate these false-positive alerts to determine whether they are actual threats requiring the creation or modification of SIEM rules. Thus, it would be beneficial to reduce the false-positives and identify true positives, i.e. true threats to computing resources, for further investigation. In so doing, the amount of manual effort needed to investigate alerts and generate appropriate responses to actual threats, e.g., new or modified SIEM rules, may be reduced.

The illustrative embodiments provide an improved computing tool to differentiate false-positive alerts from true threat alerts for further investigation by subject matter experts, e.g., security analysts and experts, and remediation of such threats. The improved computing tool of the illustrative embodiments includes a trained neural network model that translates attributes of alerts into images and then uses a trained image classification neural network model to classify the alert image into a corresponding class, e.g., false-positive alert image, true threat alert image, or indeterminate threat image. The mechanisms of the illustrative embodiments provide an analytics machine learning computing system that auto-disposes alerts based on learning prior security analyst/expert decisions and applying them to the alert images generated by the mechanisms of the illustrative embodiments. The mechanisms of the illustrative embodiments utilize unsupervised machine learning with similarly encoded images to detect anomalies within alert images, further augmenting computing system capabilities to automatically disposition true threats.

In addition, the mechanisms of the illustrative embodiments may be used directly in an end user's computing environment in order to obfuscate sensitive data and securely send it over the network directly into the alert image classification computing tool of the illustrative embodiments for auto-dispositioning. That is, at the end user's computing environment, alerts and logged entries may be translated into an image representation of the alert or logged entry, referred to herein as an alert image. The alert image may then be transmitted to a remotely located alert image classification computing tool of the illustrative embodiments, thereby ensuring that only the alert image data is exposed outside the end user's computing environment. Hence, an unauthorized interloper will at most be able to access the encoded alert image data, but without knowing the manner by which the encoded alert image data is encoded from the original alert or logged entries, will be unable to ascertain the private or sensitive data from which the encoded alert image data was generated. Additional security mechanisms, such as private-public key mechanisms, random seed values, and the like, may be used to increase the security of the alert image generation process and decrease the likelihood that an interloper will be able to extract the sensitive underlying alert/log data that is the basis of the alert image data transmitted to the alert image classification computing tool of the illustrative embodiments.

In one illustrative embodiment, the advanced image recognition for threat disposition scoring (AIRTDS) computing tool comprises two primary cognitive computing system elements which may comprise artificial intelligence based mechanisms for processing threat alerts/logged data to identify and differentiate true threat based alerts/log entries from false-positive threat alerts/log entries. A first primary cognitive computing system element comprises an alert/log entry image encoding mechanism (referred to hereafter as an alert image encoder). The alert image encoder comprises one or more algorithms for encoding alert/log entry attributes into corresponding pixels of a digital image representation of the alert/log entry having properties, e.g., pixel location within the digital image representation, color of pixels, etc., that are set to correspond to the encoded alert/log entry attribute. The alert/log attributes that are encoded may comprise various types of alert/log attributes extracted from the alert/log entry, such as remedy customer ID, source Internet Protocol (IP) address, destination IP, event name, SIEM rule triggering alert/log entry, attack duration, and the like. Different encoding algorithms may be applied to each type of alert/log entry attribute and each encoding algorithm may target a predefined section of the image representation where the corresponding alert/log entry attribute is encoded.

While each encoding algorithm may encode the corresponding alert/log entry attribute in a different section of the image representation, the encoding algorithm is configured such that the combination of sections of the image representation are encoded in manner where a visual pattern that is present across the sections is generated. Thus, the algorithms are specifically configured to work together to generate a visual pattern, i.e. a repeatable set of pixel properties and locations within a section, that spans across the plurality of sections of the image representation. The visual pattern is visually discernable by the human eye even if the underlying meaning of the visual pattern is not human recognizable from the visual nature, e.g., the human viewing the image representation of the alert can see that there is a pattern, but cannot ascertain that the particular pattern, to a cognitive computing system of the illustrative embodiments, represents a true threat to a computing resource.

A second primary cognitive computing system element comprises an alert/log entry classification machine learning mechanism that classifies alerts/log entries as to whether they represent true threats, false-positives, or indeterminate alerts/log entries. The alert/log entry classification machine learning mechanism may comprise a neural network model, e.g., a convolutional neural network (CNN), that is trained to classify images into one of a plurality of pre-defined classes of images based on image analysis algorithms applied by the nodes of the neural network model to extract and process features of the input image based on learned functions of the extracted features. In one illustrative embodiment, the pre-defined classes of images comprises classifying an encoded image representation of an alert/log entry into either a true-threat classification or a false-positive classification (not a true threat). In this implementation, the neural network model only processes alerts/log entries that correspond to potential threats to computing resources identified by a monitoring tool, such as SIEM system. In some implementations, additional classifications may also be utilized, e.g., indeterminate threat classification where it cannot be determined whether the alert/log entry corresponds to one of the other predetermined classes, non-threat classification in embodiments where all log entries over a predetermined period of time are processed to generate image representations which are then evaluated as to whether they represent a threat or a non-threat, etc. For purposes of illustration, it will be assumed that an embodiment is implemented where the predetermined classifications consist of a true-threat classification and a false-positive classification.

Assuming a SIEM computing system based implementation of the illustrative embodiments, during a training phase of operation, the mechanisms of the AIRTDS computing tool process a set of alerts (offenses) generated by the SIEM computing system which are then dispositioned by a human security analyst/expert with a label of "true threat" or "false positive." That is, a human security analyst/expert is employed to generate a set of training data comprising alerts that are labeled by the human security analyst/expert as to whether they are true threats or false positives. Each alert is encoded as an image representation by extracting the alert attributes from the alert that are to be encoded, and then applying corresponding encoding algorithms to encode those extracted alert attributes into sections of the image representation. For example, in one illustrative embodiment, the image representation of an alert/log entry is a 90×90 pixel image made up of smaller 90×5 pixel grids, each smaller grid representing an area for encoding individual alert attributes, or encoding of combinations of a plurality, or subset, of alert attributes.

For example, using an example of an IBM® QRadar® Security Intelligence Platform as a SIEM system implementation, the mechanisms of the illustrative embodiments may extract a remedy customer ID (e.g., remedy customer ID: JPID001059) from an alert generated by the SIEM system and encode the remedy customer ID by converting a predetermined set of bits of the remedy customer ID, e.g., the last 6 digits of the remedy customer ID (e.g., 001059, treating the digits as a 24 bit value), to corresponding red, green, blue (RGB) color properties of a set of one or more pixels in a section of the image representation of the alert. The whole customer ID may be used to set pixel locations for the corresponding colored pixels by applying a bit mask to each character's ASCII value to determine whether or not to place a colored pixel, having the RGB color corresponding to the predetermined set of bits of the remedy customer ID, at a corresponding location.

Other encoding of other alert attributes may be performed to generate, for each section of the image representation, a corresponding sub-image pattern which together with the other sub-image patterns of the various sections of the image representation, results in a visual image pattern present across the various sections. Examples of various types of encoding algorithms that may be employed to encode alert attributes as portions of an image representation of the alert/log entry will be provided in more detail hereafter. A combination of a plurality of these different encoding algorithms for encoding alert attributes may be utilized, and even other encoding algorithms that may become apparent to those of ordinary skill in the art in view of the present description may be employed, depending on the desired implementation. The result is an encoded image representation of the original alert generated by the SIEM computing system which can then be processed using image recognition processing mechanisms of a cognitive computing system, such as an alert/log entry classification machine learning computing system.

That is, in accordance with the illustrative embodiments, the encoded image representation is then input to the alert/log entry classification machine learning mechanism which processes the image to classify the image as to whether the alert/log entry classification machine learning mechanism determines the image represents a true threat or is a false positive. In some illustrative embodiments, the alert/log entry classification machine learning mechanism comprises a convolutional neural network (CNN) that comprises an image pre-processing layer to perform image transformation operations, e.g., resizing, rescaling, shearing, zoom, flipping pixels, etc., a feature detection layer that detects and extracts a set of features (e.g., the layer may comprise 32 nodes that act as feature detectors to detect 32 different features) from the pre-processed image, and a pooling layer which pools the outputs of the previous layer into a smaller set of features, e.g., a max-pooling layer that uses the maximum value from each of a cluster of neurons or nodes at the prior layer (feature extraction layer in this case). The CNN may further comprise a flattening layer that converts the resultant arrays generated by the pooling layer into a single long continuous linear vector, fully connected dense hidden layers which learn non-linear functions of combinations of the extracted features (now flattened into a vector representation by the flattening layer), and an output layer which, in some illustrative embodiments, may be a single neuron or node layer that outputs a binary output indicating whether or not the input image representation is representative of a true threat or a false positive.

In some illustrative embodiments, the neurons or nodes may utilize a rectified linear unit (Relu) activation function, while in other illustrative embodiments, other types of activation functions may be utilized, e.g., softmax, radial bias functions, various sigmoid activation functions, and the like. Moreover, while a CNN implementation having a particular configuration as outlined above is used in the illustrative embodiments described herein, other configurations of machine learning or deep learning neural networks may also be used without departing from the spirit and scope of the illustrative embodiments.

Through a machine learning process, such as an unsupervised machine learning process, the alert/log entry classification machine learning mechanism is trained based on the human security analyst/expert provided labels for the corresponding alerts, to recognize true threats and false positives. For example, the machine learning process modifies operational parameters, e.g., weights and the like, of the nodes of the neural network model employed by the alert/log entry classification machine learning mechanism so as to minimize a loss function associated with the neural network model, e.g., a binary cross-entropy loss function, or the like. Once trained based on the training data set comprising the alert image representations and corresponding human analyst/expert label annotations as to whether the alert is a "true threat" (anomaly detected) or "false positive" (anomaly not detected), the trained alert/log entry classification machine learning mechanism may be applied to new alert image representations to classify the new alert image representations as to whether they represent true threats or false positives.

As mentioned previously, in accordance with some illustrative embodiments, one significant benefit obtained by the mechanisms of the present invention is the ability to maintain the security of an end user's private or sensitive data, e.g., SIEM event data, within the end user's own computing environment. That is, in some illustrative embodiments, the alert image encoder may be deployed within the end user's own computing environment so that the encoding of alerts as alert image representations may be performed within the end user's own computing environment with only the alert image representation being exported outside the end user's computing environment for processing by the alert/log entry classification machine learning mechanisms of the illustrative embodiments. Thus, the end user's sensitive or private data does not leave the end user's secure computing environment and third parties are not able to discern the sensitive or private data without having an intimate knowledge of the encoding algorithms specifically used. It should further be appreciated that other security mechanisms, such as encryption, random or pseudo-random seed values used in the encrypting algorithms, and the like, may be used to add additional variability and security to the encryption algorithms and to the generated alert image representation to make it less likely that a third party will be able to reverse engineer the alert image representation to generate the sensitive or private data.

Thus, the illustrative embodiments provide mechanisms for converting alerts/log entries into an image representation of the alerts/log entries for processing by cognitive image recognition mechanisms that use machine learning to recognize alert/log entry image representations that represent true threats or false positives. By converting the alerts/log entries into image representations and using machine learning to classify the alerts/log image representations, the evaluation of the alerts/log entries are not dependent on strict alphanumeric text comparisons which may be apt to either miss actual threats or be over-inclusive of alerts/log entries that do not represent actual threats. Moreover, because the mechanism of the illustrative embodiments utilize image recognition based on image patterns, the mechanisms of the illustrative embodiments are adaptable to new alerts/log entries attribute combinations that result is such patterns, without having to wait for human intervention to generate new rules to recognize new threats.

Before discussing the various aspects of the illustrative embodiments further, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
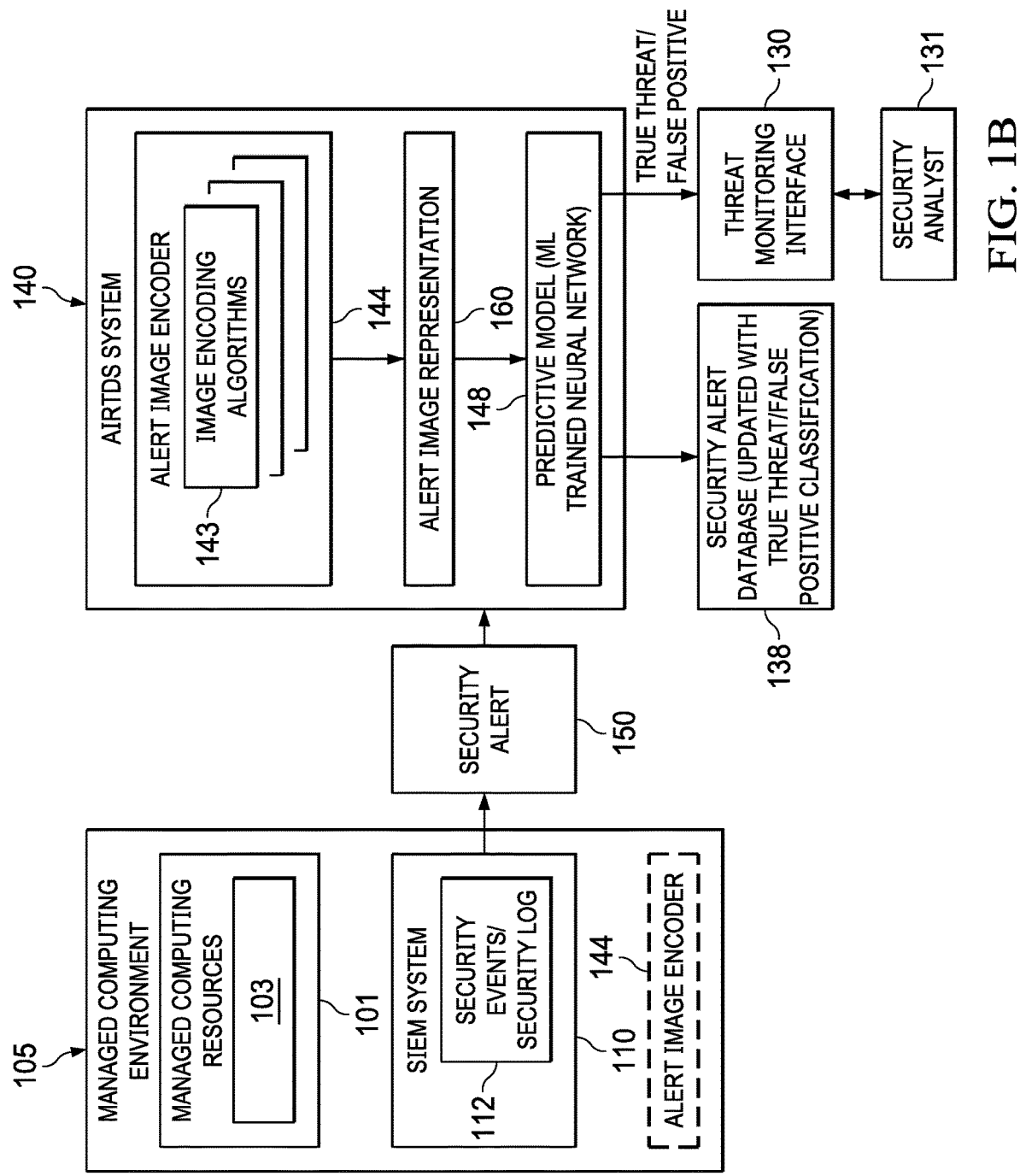
FIG. 1B is an example diagram illustrating the primary operational elements for runtime operation of an AIRTDS computing system, after training of the AIRTDS computing system, and a workflow of these primary operational elements, in accordance with one illustrative embodiment.

FIG. 1A is an example diagram illustrating the primary operational elements for a training phase of an advanced image recognition for threat disposition scoring (AIRTDS) computing system, and a workflow of these primary operational elements, in accordance with one illustrative embodiment. FIG. 1B is an example diagram illustrating the primary operational elements for runtime operation of an AIRTDS computing system, after training of the AIRTDS computing system, and a workflow of these primary operational elements, in accordance with one illustrative embodiment. Similar reference numbers in FIGS. 1A and 1B represent similar elements and workflow operations. FIGS. 1A and 1B assume an implementation that is directed to a security intelligence event monitoring (SIEM) based embodiment in which a SIEM system provides security alerts for classification as to whether they represent true threats or false positives (it can be appreciated that a SIEM system will not generate an alert for events that do not represent potential threats and thus, security alerts only represent either true threats or false positives). However, as noted above, it should be that the illustrative embodiments are not limited to operation with SIEM systems or security alerts and may be used with any mechanism in which event notifications/logged entries need to be classified into one of a plurality of classes, and which can be converted into an image representation in accordance with the mechanisms of the illustrative embodiments.

As shown in FIG. 1A, a SIEM computing system 110, which may be positioned in an end user computing environment 105, obtains security log information from managed computing resources 101 in the end user computing environment 105, e.g., servers, client computing devices, computing network devices, firewalls, database systems, software applications executing on computing devices, and the like. Security monitoring engines 103 may be provided in association with these managed computing resources, such as agents deployed and executing on endpoint computing devices, which collect security events and provide the security event data to the SIEM computing system 110 where it is logged in a security log data structure 112. In some illustrative embodiments, the security monitoring engine(s) 103 themselves may be considered an extension of the SIEM computing system 110 and may apply SIEM rules to perform analysis of the security events to identify event data indicative of suspicious activity that may be indicative of a security attack or vulnerability, triggering a security alert 120 or security log entry to be generated. Moreover, the security monitoring engine(s) may provide such security event log information to the SIEM system 110 for further evaluation. In other illustrative embodiments, the security event data gathered by the security monitoring engines may be provided to the SIEM system 110 for logging in a security log 112 and for generation of security alerts 120.

The security event data may specify various events associated with the particular managed computing resources 101 that represent events of interest to security evaluations, e.g., failed login attempts, password changes, network traffic patterns, system configuration changes, etc. SIEM rules are applied by the agents 103 and/or SIEM computing system 110, e.g., IBM® QRadar® Security Intelligence Platform, to the security log information to identify potential threats to computing resources and generate corresponding security alerts 120. The security alerts 120 may be logged in one or more security alert log entries or may be immediately output to a threat monitoring interface 130 as they occur.

The threat monitoring interface 130 is a user interface that may be utilized by a security analyst to view security alerts 120 and determine the veracity of the security alerts 120, i.e. determine whether the security alerts 120 represent an actual security threat or a false-positive generated by the SIEM rules applied by the SIEM computing system 110. The threat monitoring interface 130 receives security alerts 120 and displays the security alert attributes to a security analyst 131 via a graphical user interface so that that security analyst 131 is able to manually view the security alert attributes, investigate the basis of the security alert 132, and then label the security alert 120 as being representative of an actual threat 134 to computing resources 101 of the end user computing environment 105, or a false positive alert 136. The labeled security alert data is then stored in an entry in the security alert database 138 and thereby generate a training dataset comprising security alert entries and corresponding labels as to the correct classification of the alert as to whether it represents a true threat or a false positive.

The training dataset, comprising the security alerts and their corresponding correct classifications, are exported 142 into an alert image encoder 144 of the AIRTDS system 140. The alert image encoder 144 extracts alert attributes from the security alert entries in the training dataset exported from the security alert database 138 and applies image encoding algorithms 143 to the corresponding extracted alert attributes to encode portions of an image representation of the security alert. Thus, for each security alert, and for each alert attribute of each security alert, a corresponding encoded section of an alert image representation is generated. Each alert attribute may have a different encoding performed by a different type of alert attribute image encoding algorithm that is specific to the particular alert attribute type. Examples of the alert attribute encodings for a variety of different alert attributes will be described hereafter with regard to example illustrative embodiments.

The resulting encoded alert image representations 146 are input to a cognitive predictive computer model 148 which is then trained based on the encoded alert image representations 146 and the corresponding correct labels, i.e. "true threat" or "false positive", associated with the corresponding security alert entry exported 142 to the alert image encoder 144. The cognitive predictive computer model 148 may be the alert/log entry classification machine learning mechanism previously described above which may employ a neural network model, such as a convolutional neural network (CNN) model, that is trained through a machine learning process using the training dataset comprising the alert image representations 146 and the corresponding ground truth of the correct labels generated by the security analyst 131 and stored in the security alert database 138.

As mentioned previously, this machine learning may be a supervised or unsupervised machine learning operation, such as by executing the CNN model on the alert image representation for security alerts to thereby perform image recognition operations on image features extracted from the alert image representation, generating a classification of the alert as to whether it represents a true threat or a false positive, and then comparing the result generated by the CNN model to the correct classification for the security alert. Based on a loss function associated with the CNN model, a loss, or error, is calculated and operational parameters of nodes or neurons of the CNN model are modified in an attempt to reduce the loss or error calculated by the loss function. This process may be repeated iteratively with the same or different alert image representations and security alert correct classifications. Once the loss or error is equal to or less than a predetermined threshold loss or error, the training of the CNN model is determined to have converged and the training process may be discontinued. The trained CNN model, i.e. the trained alert/log entry classification machine learning mechanism 148 may then be deployed for runtime execution on new security alerts to classify their corresponding alert image representations as to whether they represent true threats to computing resources or are false positives generated by the SIEM system 110.

FIG. 1B illustrates an operation of the trained alert/log entry classification machine learning mechanism 148 during runtime operation on new security alerts 150 generated by the SIEM system 110. It should be noted that in the runtime operation shown in FIG. 1B, the threat monitoring interface 130 is not necessary to the runtime operation as the threat monitoring interface 130 was utilized to allow a security analyst 131 to provide a correct label for the security alerts 120 for purposes of training. Since the training has been completed prior to the runtime operation of FIG. 1B, the new security alerts 150 may be input directly into the AIRTDS system 140. That is similar to the operation of the SIEM system 110 during the training operation, the SIEM system 110 generates new security alerts 150 which, during runtime operation, are sent directly to the AIRTDS system 140 for encoding by the alert image encoder 144 as alert image representations 160. The alert image representations, as with the alert image representations generated during training, are data structures specifying image pixel characteristics for each pixel of a predefined size alert image and which encode alert attributes in predefined sections of the alert image representation. As with the training operation, the alert image encoder 144 applies the encoding algorithms 143 to the extracted alert attributes from the security alert 150 and generates the alert image representation 160 that is input to the trained predictive model 148.

The trained predictive model 148 operates on the alert image representation 160 to apply the trained image recognition operations of the nodes/neurons of the CNN to the input alert image representation data and generates a classification of the alert image representation 160 as to whether it represents a true threat to computing resources detected by the SIEM system 110, or is a false positive, i.e. an alert generated by the SIEM system 110, but which is not in fact representative of a true threat to computing resources. The output classification generated by the predictive model 148 may be provided to a security analyst, such as via the threat monitoring interface 130 in FIG. 1A, for further evaluation, logged in the security alert database 138, or otherwise made available for further use in determining the correct/incorrect operation of the SIEM system 110 and performing responsive actions to improve the operation of the SIEM system 110 and/or protect the computing resources of the end user computing environment 105.

It should be appreciated that there are many modifications that may be made to the example illustrative embodiments shown in FIGS. 1A and 1B without departing from the spirit and scope of the illustrative embodiments. For example, while FIGS. 1A and 1B illustrate the alert image encoder 144 as being part of the AIRTDS system 140 in a separate computing environment from the end user computing environment 105, the illustrative embodiments are not limited to such. Rather, in some illustrative embodiments, the alert image encoder 144 may be deployed in the end user computing environment 105 and may operate on security alerts 120, 150 generated by the SIEM system 110, within the end user computing environment 105, as represented by the dashed line alternative shown in FIGS. 1A and 1B. In such embodiments, rather than exporting the security alerts 120, 150 to the threat monitoring interface 130 or AIRTDS system 140, instead the encoded alert image representations may be exported. During training, the security analyst 131 may view the security alerts 120, 150 using a user interface that is accessible within the end user computing environment 105 and the exported alert image representations 120 may be output along with their corresponding labels as to whether they are true threats or false positives. The outputting of such alert image representations and corresponding correct labels may be performed as a training dataset that is exported directly to the AIRTDS system 140 for processing by the predictive model 148.

In addition, as another modification example, rather training the predictive model 148 on both true threat and false positive alert image representations, the predictive model 148 may be trained using an unsupervised training operation on only false positive alert image representations so that the predictive model 148 learns how to recognize alert image representations that corresponding to false positives. In this way, the predictive model 148 regards false positives as a "normal" output and any anomalous inputs, i.e. alert image representations that are not false positives, as true threats. Hence a single node output layer may be provided that indicates 1 (normal—false positive) or 0 (abnormal—true threat), for example.

Other modifications may also be made to the mechanisms and training/runtime operation of the AIRTDS system 140 without departing from the spirit and scope of the illustrative embodiments. For example, various activation functions, image encoding algorithms, loss functions, and the like may be employed depending on the desired implementation.

As noted above, the alert image encoder 144 applies a variety of different image encoding algorithms to the alert attributes extracted from the security alerts 120, 150 generated by the SIEM system 110. To illustrate examples of such image encoding algorithms a description of an example SIEM system security alert 120, 150 generated by an implementation of the SIEM system 110 as the IBM® QRadar® Security Intelligence Platform will now be described. FIG. 2A is an example diagram illustrating a data layout of extracted security alert attributes for a security alert that may be generated by the IBM® QRadar® Security Intelligence Platform in accordance with one illustrative embodiment. As shown in FIG. 2A, the alert attributes include a remedy customer ID, an industry identifier, a QRadar rule name/Qradar rule name count/isQRalert attribute, an alert score QSeverity/Magnitude attribute, Event Count/Rule Fire Count attribute, a Source (Src) Geo/Src Geo count attribute, a Destination (Dst) geo/Dst Geo Count attribute, Event Names/Event Names count attribute, Event Vendor attribute, Event Groups/Event Groups count attribute, various Source and Destination IP count attributes and traffic count attributes, an attack duration attribute, and an alert creation time attribute. These are only examples, other SIEM systems may generate other types of attributes that may be the basis of the operation of the illustrative embodiments with regard to alert image representation generation and image analysis to identify the veracity of an alert in accordance with one or more illustrative embodiments.

The alert image encoding algorithms 143 applied by the alert image encoder 144 are selected and configured taking into account a desirability to visually represent the alert attributes so that they are visually easier to identify each block of alert attribute data represented in an image form. That is, the alert image encoding algorithms 143 are specifically selected and configured such that they generate a visual pattern identifiable by the human eye as a pattern, even though the underlying meaning of the pattern is not necessarily human understandable. Moreover, these algorithms 143 are selected and configured such that the patterns may be recognized across multiple sections of the resulting alert image representation, which comprises sections, each section corresponding to a different alert attribute, or subset of attributes, encoded using a different alert image encoding algorithm 143 or set of algorithms. Moreover, the alert image encoding algorithms 143 are selected and encoded to ensure scalability by modifying the sections (or grids) of the alert image representation attributed to the corresponding alert attribute(s), i.e. if there are more alert attributes to consider for a particular implementation, decrease the dimensions of the section or grid and add an additional grid for the additional alert attributes.

Furthermore, in some illustrative embodiments, each alert attribute is afforded a fixed size section or grid in the alert image representation which avoids certain portions of the alert attributes having priority over others. However, in some illustrative embodiments, the sizes of the sections or grids may be dynamically modified based on a determined relative priority of the corresponding alert attributes to the overall identification of a true threat from a false positive. For example, it is determined that a particular attribute, e.g., source IP address, is more consistently representative of an true threat/false positive than other attributes, then the section (grid) of the alert image representation corresponding to the source IP address may have its dimensions modified to give them greater priority in the results generated by the image recognition processing performed by the trained predictive model 148.

With the alert image encoding performed by the alert image encoder 144, the alert image representation is configured to a predefined image size having sections, or grids, of a predetermined size. Each section or grid corresponds to a single alert attribute encoded as an image pattern, or a subset of alert attributes that are encoded as an image pattern present within that section or grid. In one illustrative embodiment, the alert image representation is a 90×90 pixel image having sections that are 90×5 pixel grids.

As an example of one type of alert attribute image encoding that may be performed by a selected and configured alert image encoding algorithm, 143, the remedy customer ID may have certain bits of the customer ID selected and used to set color characteristics of pixels in a corresponding section of the alert image representation with the location of these pixels being dependent upon the application of a bit mask to each character of the customer ID. For example, assume a remedy customer ID of "JPID001059." In one illustrative embodiment, the last 6 digits of the remedy customer ID, i.e. "001059," may be extracted and treated as a 24 bit value to set each of red, green, and blue (RGB) pixel color values. In this case, the value "001059" is treated as the 24 bit value "000000000000010000100011" and each of the R, G, and B values for the pixels are set to this 24 bit value. A bit mask is applied to each characters ASCII value to decide whether or not to place the colored pixel at a corresponding location in the corresponding section, or grid, of the alert image representation.

As a further example, for the industry identifier and/or event vendor identifiers, a predetermined set of characters of the string may be used to set an initial pixel value, with the remaining characters being used to provide a binary representation that identifies the location of where the colored pixels are to be placed within the section or grid, using again a bit mask mechanism. For example, the first 3 characters of a character string specifying the industry identifier or the event vendor may be used to identify the red, green, and blue pixel color characteristics, e.g., Red: Char1, Green: Char2, and Blue: Char3. The $4^{th}$ character and thereafter may be used to determine the location of colored pixels having these R, G, and B color characteristics. Once a character has been mapped to the image within the corresponding section or grid, that character may replace any older RGB value, e.g., any of R, G, or B values, and then a next character of the character string, e.g., the 5$^{th}$ character and so on, may be processed.

Figure 2B:
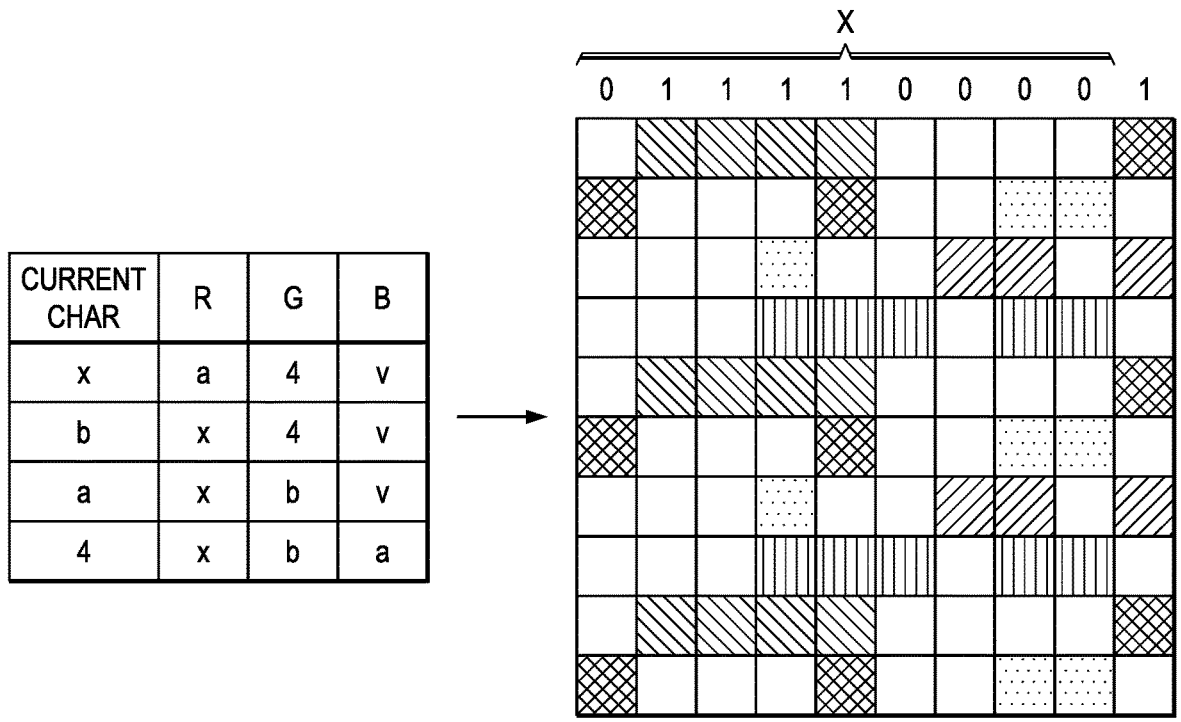
FIG. 2B is an example diagram illustrating the image encoding of the industry identifier/event vendor in accordance with one illustrative embodiment.

FIG. 2B is an example diagram illustrating the image encoding of the industry identifier/event vendor in accordance with one illustrative embodiment. The example shown in FIG. 2B assumes an industry identifier/event vendor string of "a4vxb". In this example, the characters "a", "4", and "v" are mapped to the RGB channels of the pixel and the binary representation of character "x" (e.g., 0111100001) is mapped to the image. Once "x" has been mapped to the image, "x" is mapped to the R (Red) channel, i.e. the red pixel characteristic is reset to a new value based on the "x" character, and the map now proceeds to encoding the character "b". This process may be repeated for each subsequent character until the entirety of the industry identifier and/or event vendor string is encoded as an image pattern for the section of the alert image representation.

As another encoding example, consider the QRadar Rule alert attribute information, which actually includes 3 attributes: QRadar Rule Name, QRadar Rule Name Count, and IsQRalert. In one illustrative embodiment of an image encoding algorithm operating on the QRadar Rule alert attribute information, the IsQRalert attribute is used to determine how much of the corresponding section or grid to fill with colored pixels. For example, if the IsQRalert attribute is set to a value of "true", then the full pixel grid or section is utilized. If the IsQRalert attribute is set to a value of "false," then only a sub-portion of the section or grid is utilized, e.g., a first half of the pixel grid is utilized.

The QRadar Rule Name Count attribute may be used to determine the pixel color of the pixels in the corresponding portion of the section or grid. For example, the QRadar Rule Name Count may be normalized and then values may be scaled up to be in the range 0-255, for example. The pixel color characteristics, i.e. the RGB values, are set based on the scaled count value, i.e. the value in the range from 0-255. For example, if the scaled count is 255, the RGB value may be set to (230, 0, 0), i.e. "red," otherwise the RGB characteristics are set to (count, count, count) where count is the scaled count value.

The QRadar Rule Name is used to identify the pixel location, within the portion of the section or grid (determined based on the value of the IsQRalert), where the pixel, having the pixel color characteristics determined based on the QRadar Rule Name Count attribute, is to be placed. In one illustrative embodiment a special character summation is utilized where each character added to the sum is multiplied by its index in the string. A bit mask is then applied to the summation to determine whether or not to place the colored pixel at the corresponding location.

In another example, for source/destination geographical identifier and/or source/destination geographical count, the count may be used again as a basis for setting the pixel color by normalizing the source/destination geographical count and then scaling the values up to be in the 0-255 range. The resulting scaled count values may be used to set the RGB color characteristics for the pixel, again with a count of 255 being set to (230, 0, 0) while other counts are have the RGB values set to (count, count, count). The source/destination geographical identifier may be used to determine the location of the pixels within the corresponding section or grid by applying a bit mask to each character in the source/destination geographical identifier string to determine whether or not to place the colored pixel at the corresponding location.

Similar encoding approaches may be applied to event names and event names count and the alert score and magnitude. For example, with regard to the event name and event names count, the event names count may again be normalized and scaled to the 0-255 range to generate a pixel color characteristic for the pixel similar to the above, and the event name may have a bit mask applied to the event name string to determined whether or not to place the colored pixel at the location. The same is true of the alert score and magnitude where the alert score and magnitude may be normalized and scaled to the 0-255 range. The scaled alert score may be used to determine the pixel color while the scaled magnitude may be used to determine pixel location based on a bit mask applied to the scaled magnitude.

In another example, with regard to event and rule fire count attributes, the pixel color may be set to predetermined color characteristics, e.g., color characteristics (RGB) corresponding to a black color. Starting with the event count, a bit mask is applied to determine where the colored pixels are to be located, e.g., where the black pixels are to be located. Once the event count is bit masked, the next 8 pixels in the section or grid may be set to a different predetermined color, e.g., orange. Thereafter, the rule fire count may be bit masked to determine where colored pixels of the first predetermined color, e.g., black in this example, are to be placed. This process may be repeated switching between the event count and the rule fire count as a basis for determining where to locate the colored pixels until the corresponding section or grid is filled.

Figure 2C:
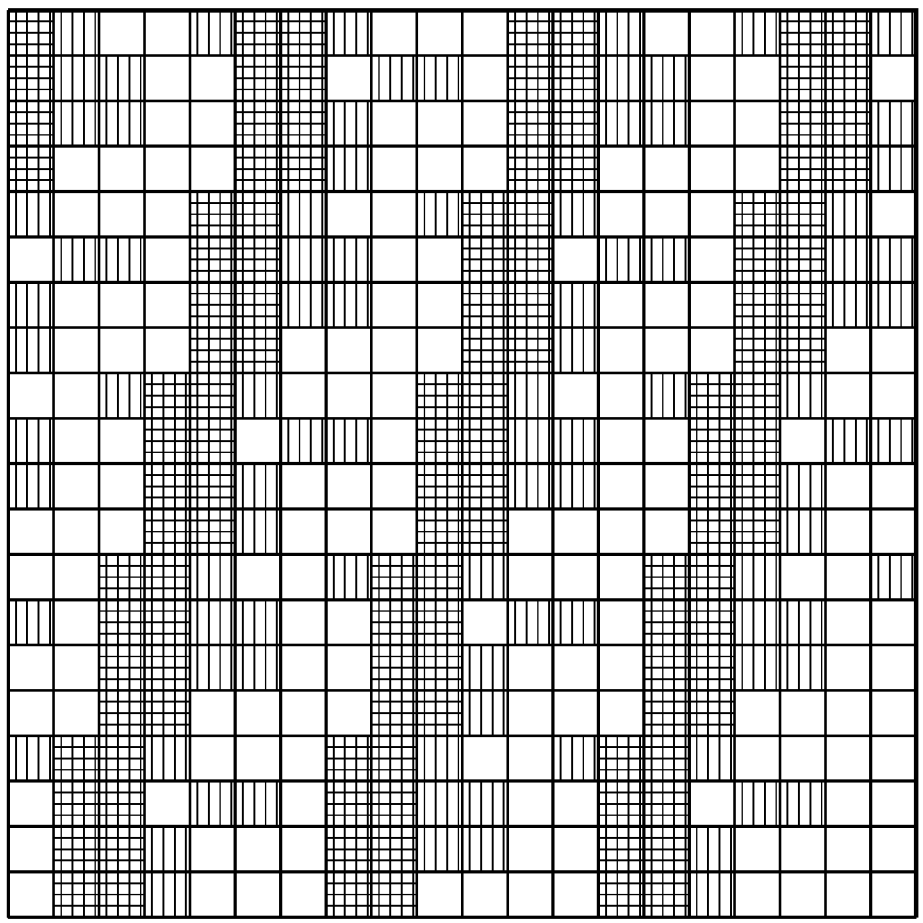
FIG. 2C is an example diagram illustrating one example of this event and rule fire count attribute image encoding in accordance with one illustrative embodiment.

FIG. 2C is an example diagram illustrating one example of this event and rule fire count attribute image encoding in accordance with one illustrative embodiment. As shown in FIG. 2C, an event count (16 bit value) for an event count of 4717 (binary representation 0001001001101101) and a rule fire count (16 bit value) of 39 (binary representation 0000000000100111) is utilized. The resulting image pattern for a corresponding section or grid of the alert image representation is shown in which black and orange pixels are utilized.

In other examples, with regard to the source and destination IP count attributes, an encoding algorithm may be employed that sets pixel color based on the type of IP count being encoded, e.g., a different predetermined set of color characteristics (RGB) may be used for different types of IP counts, e.g., a first color for source internal IP count, a second color for source external IP count, a third color for destination internal IP count, a fourth color for destination external IP count, a fifth color for source critical IP count, a sixth color for destination critical IP count, a seventh color for source proxy IP count, etc. The encoding algorithm may switch between the source and destination IP counts for a specific type, determining where to place corresponding colored pixels in the section or grid based on a bit mask applied to the corresponding source/destination IP count. This causes a image pattern to be generated based on the switching between the various IP count attributes.

In another example, using the attack duration and alert creation time attributes, these time attributes may be treated as 24 bit values which can then be used to set the RGB values similar to that described previously with regard to the remedy customer ID attribute. For example, if a time value is "12376", the corresponding binary representation "000000000011000001011000" may be used to set each of the R, G, and B values for the color characteristics of the pixel. A bit mask may then be applied to the time value to determine whether or not to place a colored pixel at a corresponding location within the section or grid associated with the alert attribute.

Thus, various encoding algorithms may be applied to the various alert attributes to generate image patterns of pixels in the corresponding sections or pixel grids associated with those alert attributes. The combination of these image patterns within each section or pixel grid provides the alert image representation for the alert as a whole, i.e. the combination of alert attributes. It should be appreciated that the above are only examples of alert attribute image encoding algorithms that may be utilized to convert alert attributes to image patterns. Other image encoding algorithms that may be apparent to those of ordinary skill in the art in view of the present description may be used without departing from the spirit and scope of the illustrative embodiments.

Figure 3A:
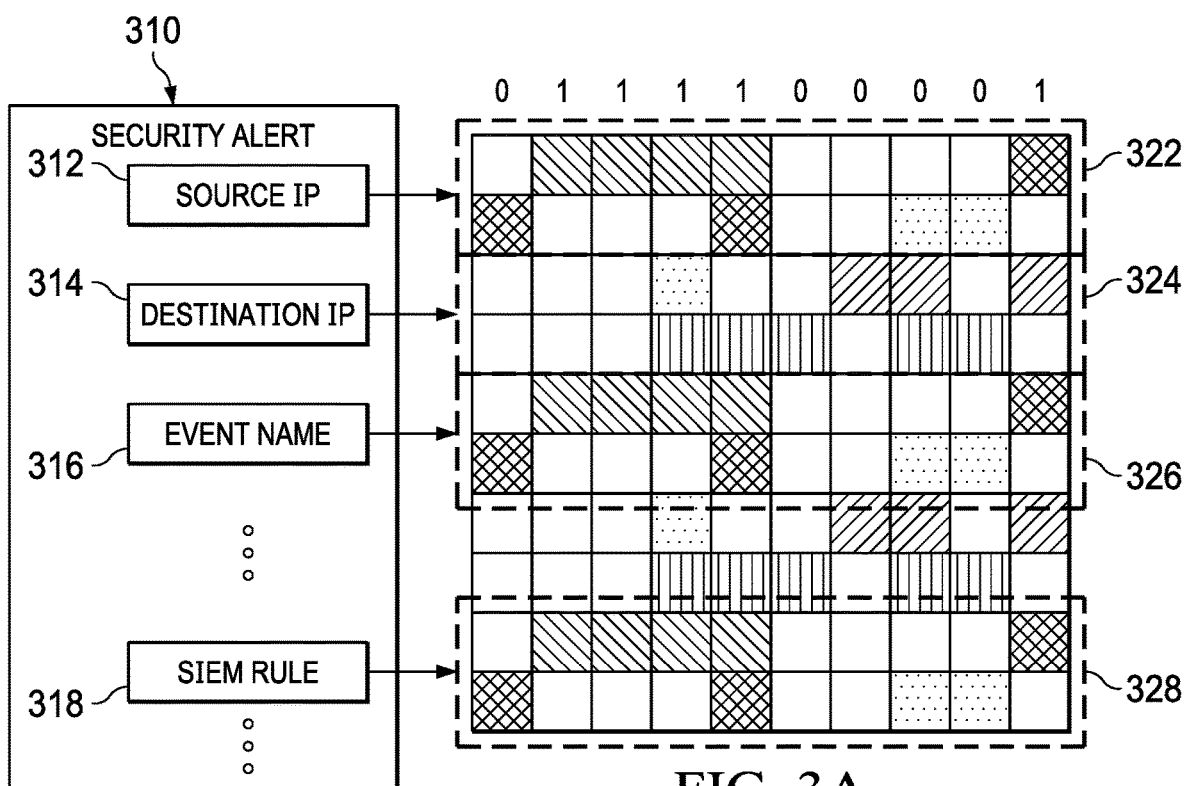
FIG. 3A is a block diagram illustrating the operation of the alert attribute image encoding operation according to one illustrative embodiment.
Figure 3B:
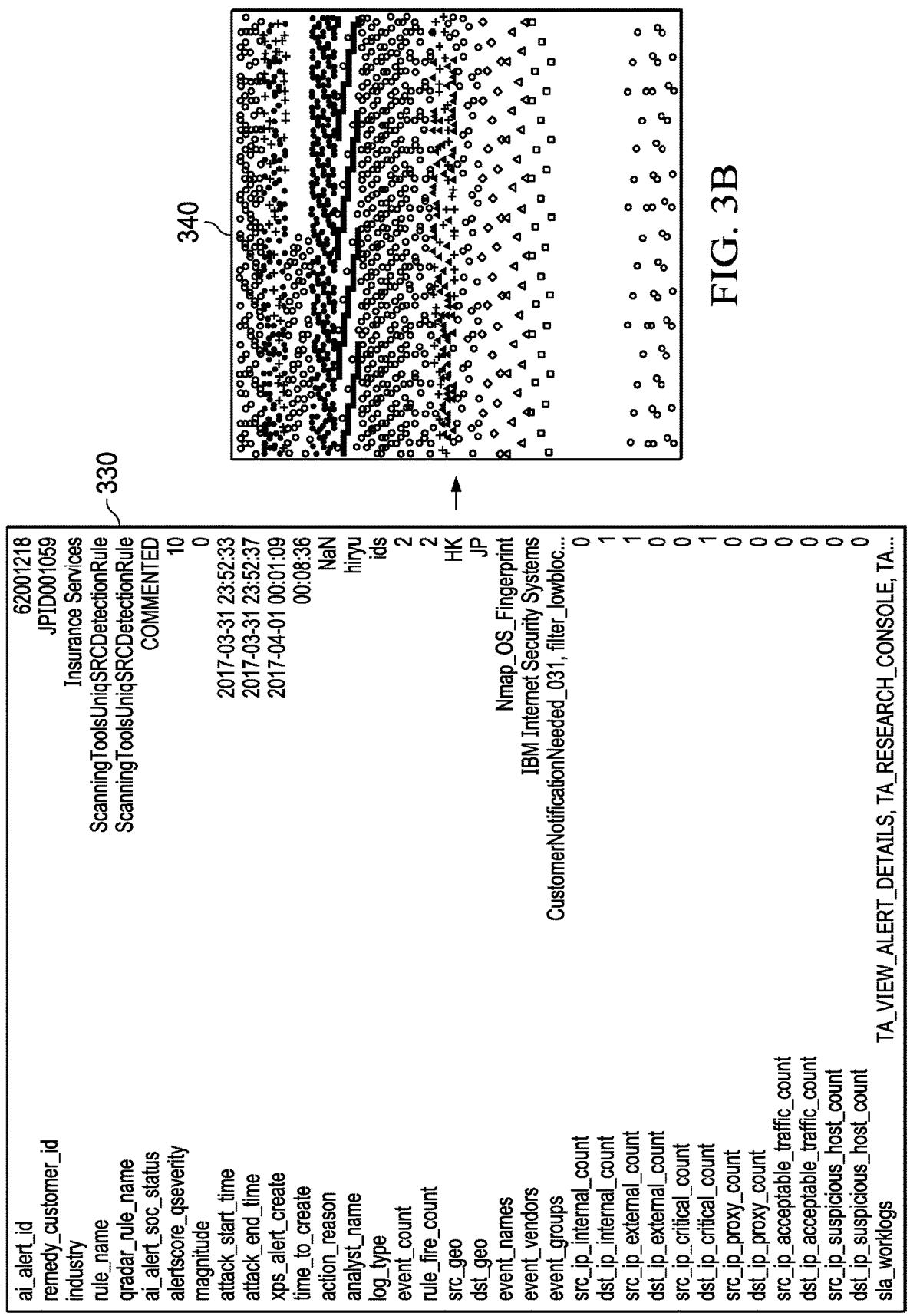
FIG. 3B is an example diagram illustrating an encoding of an alert generated by the IBM® QRadar® Security Intelligence Platform as an alert image representation in accordance with one illustrative embodiment.

FIG. 3A is a block diagram illustrating the operation of the alert attribute image encoding operation according to one illustrative embodiment. As shown in FIG. 3A, each of alert attributes 312-318 of an alert 310 generated by the SIEM system are encoded as pixel image patterns in corresponding sections 322-328 of an alert image representation 320. Again, the particular pixel colors utilized, locations of colored pixels, and the patterns of the colored pixels within the corresponding sections 322-328 will be dependent on the particular alert attribute image encoding algorithm utilized, and the particular values of the alert attributes themselves. Moreover, the particular bit mask utilized will also determine the location of the pixels. The bit mask may be generated dynamically based on any desirable security mechanism, e.g., public/private key mechanism, random/pseudo-random seed values, etc., so long as both the alert image encoder and the predictive model mechanisms are aware of the key/value utilized so as to be able to properly process the encoded image. Thus, if a different bit mask is utilized, different image patterns are generated based on the different locations of the colored pixels, making it more difficult for a third party interloper to be able to reverse engineer the encoded alert image representation and gain access to private or sensitive alert attribute data FIG. 3B is an example diagram illustrating an encoding of an alert generated by the IBM® QRadar® Security Intelligence Platform as an alert image representation in accordance with one illustrative embodiment. On the left side of the diagram are the alert attributes of an alert 330 generated by the IBM® QRadar® Security Intelligence Platform. On the right side of the diagram is an encoded alert image representation of the alert 340 in which sections of the alert image representation correspond to image patterns generated from corresponding ones of the alert attributes. As can be seen from viewing the encoded alert image representation 340 in FIG. 3B, the human eye is able to discern repeated patterns of pixels in sections of the alert image representation, even though it may not be readily discernable what these patterns mean with regard to whether a true threat is represented or a false positive.

As described previously, the predictive model 148 of the AIRTDS system 140 in FIG. 1 utilizes a cognitive computing model, such as a CNN model or other deep learning neural network model, that is trained using a training dataset comprising alerts and corresponding ground truth labels as to whether the alerts represent true threats or false positives. Thereafter, the trained predictive model 148 may be used to classify new alerts that are generated by a SIEM system to determine whether they represent true threats or false positives and thereby direct the attention of human analysts to those alerts that are indicative of true threats and avoid the waste of resources expended on alerts that are false positives.

Figure 4:
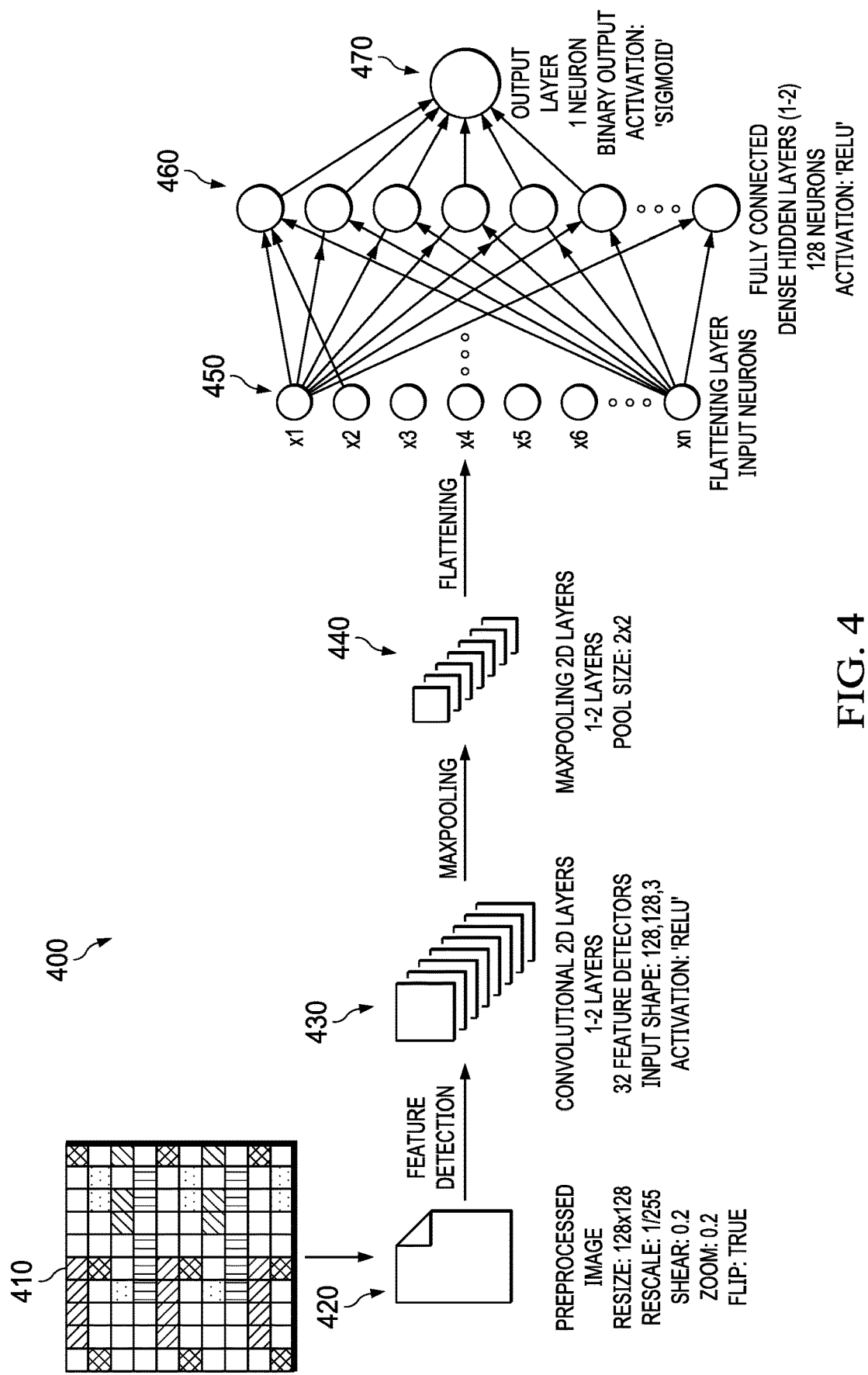
FIG. 4 is an example diagram of a convolutional neural network model that may be implemented as the predictive model of the AIRTDS system in accordance with one illustrative embodiment.

FIG. 4 is an example diagram of a convolutional neural network model that may be implemented as the predictive model 148 of the AIRTDS system 140 in FIG. 1 in accordance with one illustrative embodiment. The CNN 400 in FIG. 4 receives, as an input, a data structure that is an encoded alert image representation of an alert generated by a SIEM system, such as SIEM system 110 in FIG. 1. As shown in FIG. 4, the input alert image data structure 410 is input to a pre-processing logic stage 420 where the alert image data structure 410 may be pre-processed using one or more image transformation operations to modify the received alert image data into a size, orientation, etc. that is more easily processed by the other layers of the CNN 400. For example, various image transformations including, for example, resizing, rescaling, shearing, zooming, and flipping of the image may be performed so as to generate pre-processed alert image data that may be input to the nodes or neurons of a next layer 430 of the CNN 400 for processing.

In the next layer(s) 430 of the CNN 400, one or more convolutional layers 430 are provided for performing feature detection in the pre-processed alert image data. For example, the convolutional layers 430 shown in FIG. 4 may comprise 1-2 layers of nodes/neurons which operate on the input pre-processed alert image data to detect or extract 32 different types of features. The nodes/neurons of the convolutional layers 430 may have associated activations functions, which in the depicted example is a Relu activation function. The result of the convolutional layer 430 operations are provided to one or more max-pooling layers 440 which pools the outputs of the convolutional layers 430 into a smaller set of features, e.g., a max-pooling layer that uses the maximum value from each of a cluster of neurons or nodes at the prior layer.

The CNN 400 further includes a flattening layer 450 that converts the resultant arrays generated by the max-pooling layers 440 into a single long continuous linear vector. One or more fully connected dense hidden layers 460 are then provided which learn non-linear functions of combinations of the extracted features (now flattened into a vector representation by the flattening layer 450). The fully connected layer(s) 460 nodes/neurons again may utilize a Relu activation function and may have operational parameters, such as weights and the like, that are learned through a machine learning process. The weighted combinations of outputs from the fully connected layer(s) 460 may be provided to an output layer 470 which generates an output classification of the original input encoded alert image representation data structure 410.

In the depicted example, the output layer 470 comprises a single node/neuron which uses a sigmoid activation function and outputs a binary output indicating whether the input alert image represents an anomaly or not. Again, a normal output is indicative of a false positive whereas an anomaly is indicative of a true threat. Thus, if the output layer 470 neuron outputs an anomaly, then the input alert image represents a true threat and is not a false positive. If the output layer 470 neuron outputs a normal classification output, then the input alert image represents a false positive. This is because in the depicted example, the CNN 400 is trained using only false positive training data as part of an unsupervised machine learning process.

It should be appreciated that based on the output of the CNN 400, the predictive model 148 of the AIRTDS system 140 may indicate whether or not the received alert 150 represents an actual true threat to computing resources in the computing environment 105, or is a false positive generated by the monitoring computing system. Using the example of a SIEM computing tool, the predictive model 148 indicates whether or not the security alert generated by SIEM rules executed by the SIEM computing system 110 represent actual attacks or threats on the computing resources 101 or are false positives. The output of the predictive model 148 may be provided to the threat monitoring interface 130 or other user interface, logged in a security alert log or database, such as database 138, or otherwise made available for further review and processing. For example, in the case of a SIEM system, the results of the processing by the predictive model 148 may be provided to a security analyst 131 so that they are informed of which security alerts 150 warrant additional attention by their human efforts and which security alerts 150 are false alarms or false positives and should not be the focus of additional human efforts.

While the above illustrative embodiments are described in terms of alerts generated by a SIEM system, the illustrative embodiments are not limited to such alerts and instead may be applied to any structured notification or log entry in which attributes of the underlying events occurring within the monitored computing environment are recorded for further processing. The illustrative embodiments encode the attributes as portions of an image which can then be processed by image recognition mechanisms in a cognitive computing manner to evaluate whether or not the attributes represent a particular class of event, e.g., a true threat or a false-positive in the case of a SIEM computing system implementation. Whether these attributes are provided as alert notifications, log entries in a log data structure, or any other data structure or notification message, the mechanisms of the illustrative embodiments are applicable to such data structures.

Also, while the illustrative embodiments are described in the context of a SIEM system and alerts concerning potential security threats to computing resources, the illustrative embodiments are not limited to such and any computing resource monitoring mechanism that generates alerts and/or log entries for events occurring within a computing environment may make use of the mechanisms of the illustrative embodiments. That is, the illustrative embodiments take the alerts generated by a monitoring computing system and convert them to image representations which can then be classified using cognitive image recognition computing models. Thus, the mechanisms of the illustrative embodiments are applicable to a plethora of implementations involving alerts/log entries that may be represented as encoded images and to which image recognition mechanisms may be applied in the manner described above.

Figure 5A:
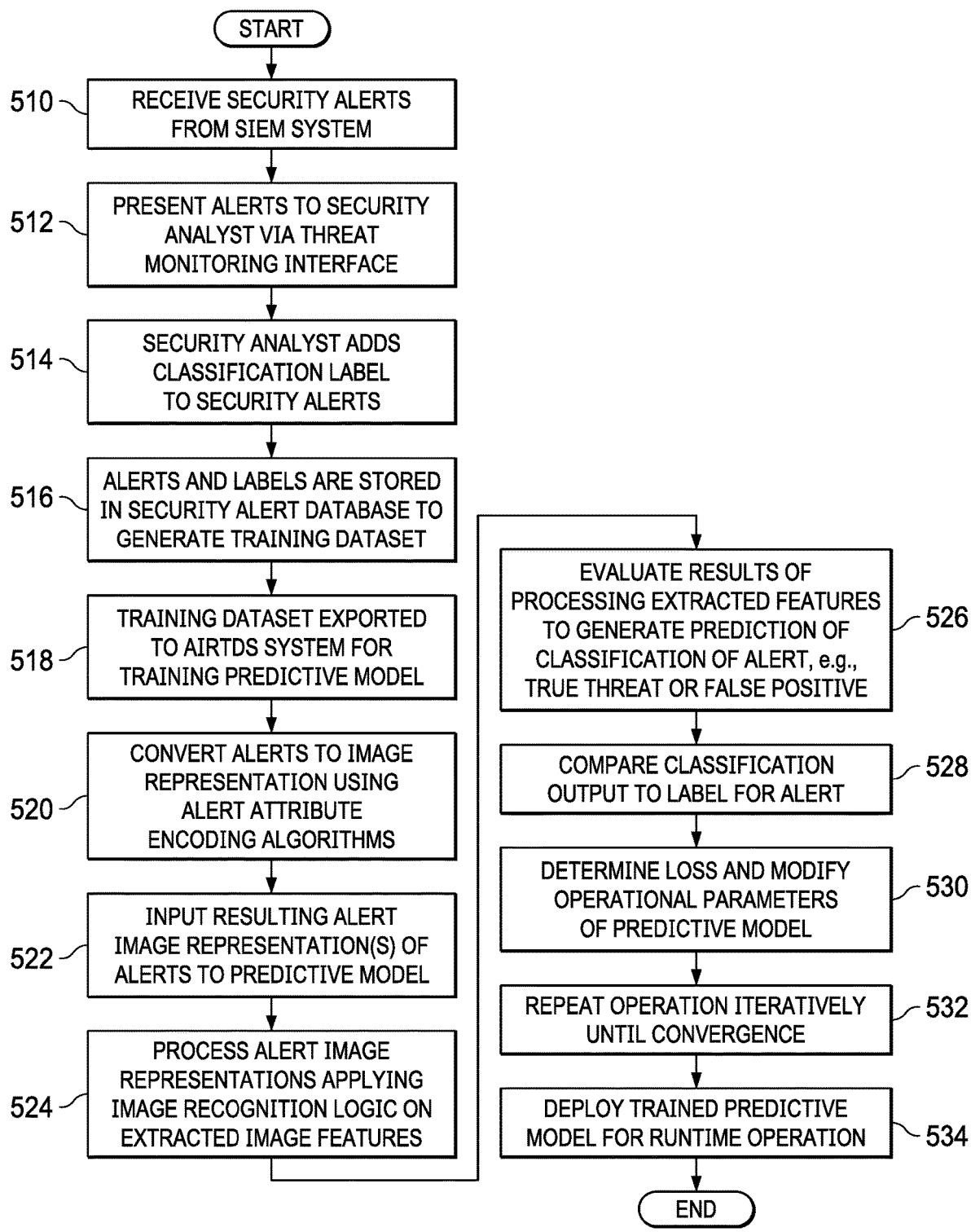
FIG. 5A is a flowchart outlining an example operation of an AIRTDS system during a training of the predictive model in accordance with one illustrative embodiment.
Figure 5B:
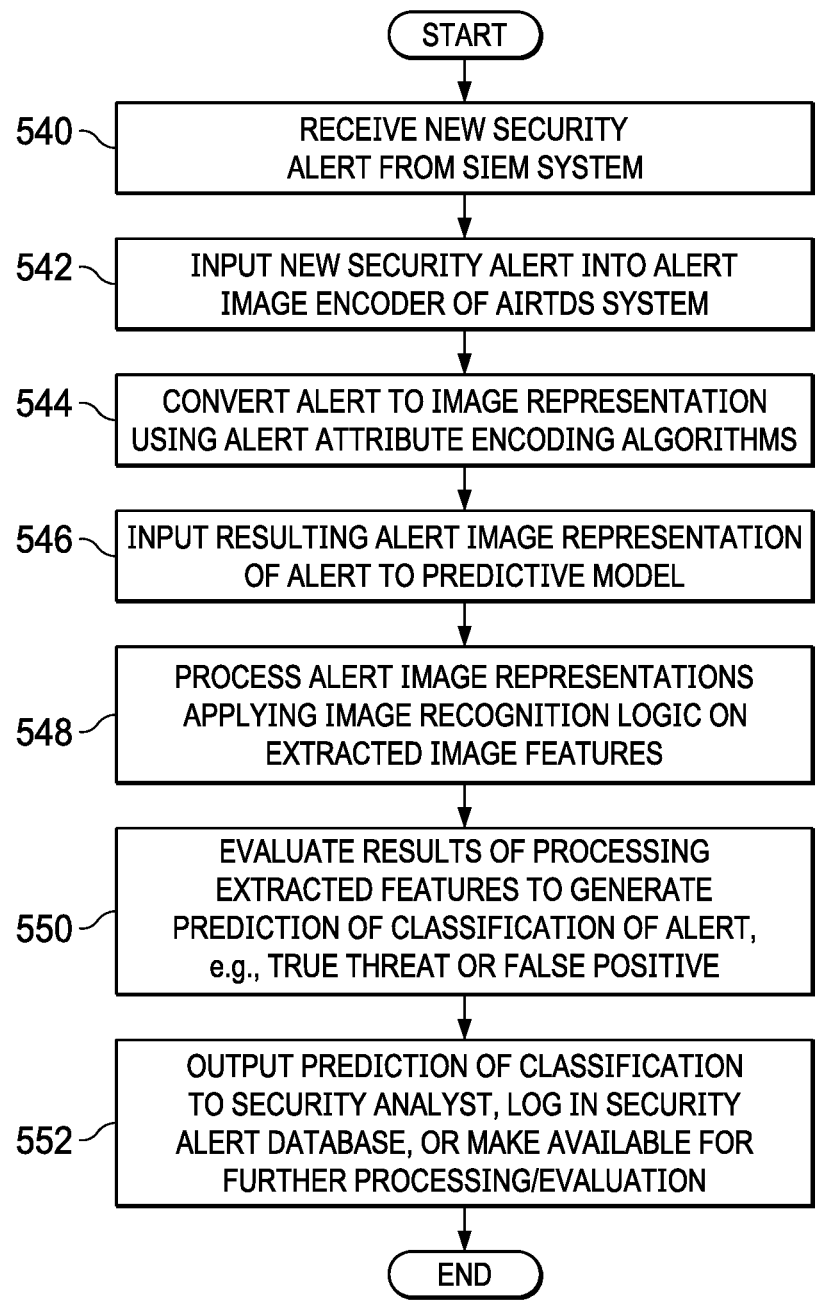
FIG. 5B is a flowchart outlining an example operation of a AIRTDS system during runtime operation in accordance with one illustrative embodiment.

FIGS. 5A and 5B illustrate flowcharts outlining an example operation of a AIRTDS system during training (FIG. 5A) and runtime operation (FIG. 5B), in accordance with one illustrative embodiment. As shown in FIG. 5A, the training operation for training the AIRTDS system starts by receiving a plurality of security alerts generated by a SIEM system monitoring security events occurring with regard to one or more computing resources of a monitored computing environment (step 510). The security alerts are submitted to a threat monitoring interface for presentation to a security analyst (step 512). The security analyst adds a classification label to the security alert indicating whether or not the security alert is associated with a true threat to security of computing resources in the monitored computing environment, or is a false positive generated by the SIEM system (step 514). The alert and its corresponding label are stored in a security alert database for use as part of a training dataset (step 516).

The training dataset is exported to the AIRTDS system for training a predictive computing model of the AIRTDS system (step 518). Each security alert in the training dataset is converted by the alert image encoder of the AIRTDS system into an alert image representation using a plurality of alert attribute image encoding algorithms that convert corresponding alert attributes to image patterns in predefined sections or grids of the alert image representation (step 520). The combination of the image patterns generated in the various sections or grids are provided as an alert image representation data structure that is input as training data into a neural network model, e.g., CNN, operating as the predictive model of the AIRTDS system (step 522). The neural network model processes the alert image representations of the security alerts and applies image recognition logic to extract features of the alert image representation and evaluate them (step 524) to generate a prediction of a classification of the security alert as to whether or not it represents a true threat or a false positive (step 526). In addition, the correct label for the corresponding security alert is provided to training logic associated with the neural network model so as to compare the correct label for the security alert to the output generated by the neural network model to determine a loss or error in the operation of the neural network model (step 528).

Based on the determined loss or error, the training logic adjusts operational parameters of the neural network model to reduce the loss or error in the neural network model output (step 530). This operation is repeated in an iterative manner until the loss or error is equal to or less than a predetermined threshold (step 532). The trained predictive model being deployed for runtime processing of new security alerts (step 534). The operation then terminates.

With reference now to FIG. 5B, during runtime operation, a new security alert is generated by the SIEM system (step 540) and input to an alert image encoder of the AIRTDS system (step 542). The alert image encoder of the AIRTDS system converts the security alert into an alert image representation using a plurality of alert attribute image encoding algorithms that convert corresponding alert attributes to image patterns in predefined sections or grids of the alert image representation (step 544). The combination of the image patterns generated in the various sections or grids are provided as an alert image representation data structure that is input to the trained neural network predictive model of the AIRTDS system (step 546). The neural network predictive model processes the alert image representation and applies image recognition logic to extract features of the alert image representation and evaluate them (step 548) to generate a prediction of a classification of the security alert as to whether or not it represents a true threat or a false positive (step 550). The prediction output is then provided to a security analyst, logged in a security alert database, and/or otherwise made available for further processing or evaluation by security analysts to handle security alerts that represent true security threats and avoid wasted resource expenditures on security alerts that are likely false positives (step 552). The operation then terminates.

Figure 6:
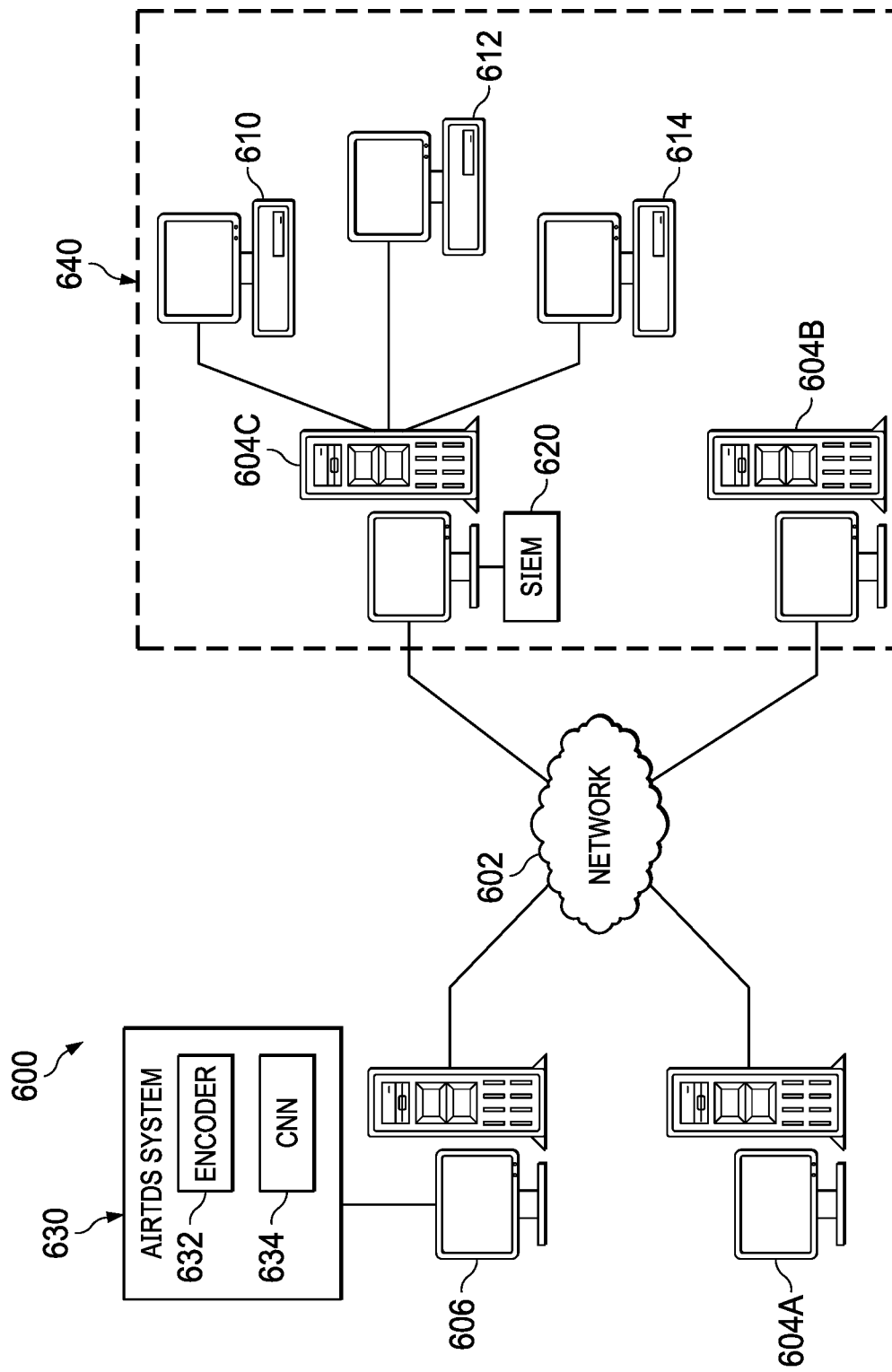
FIG. 6 is an example diagram of a distributed data processing system in which aspects of the illustrative embodiments may be implemented.
Figure 7:
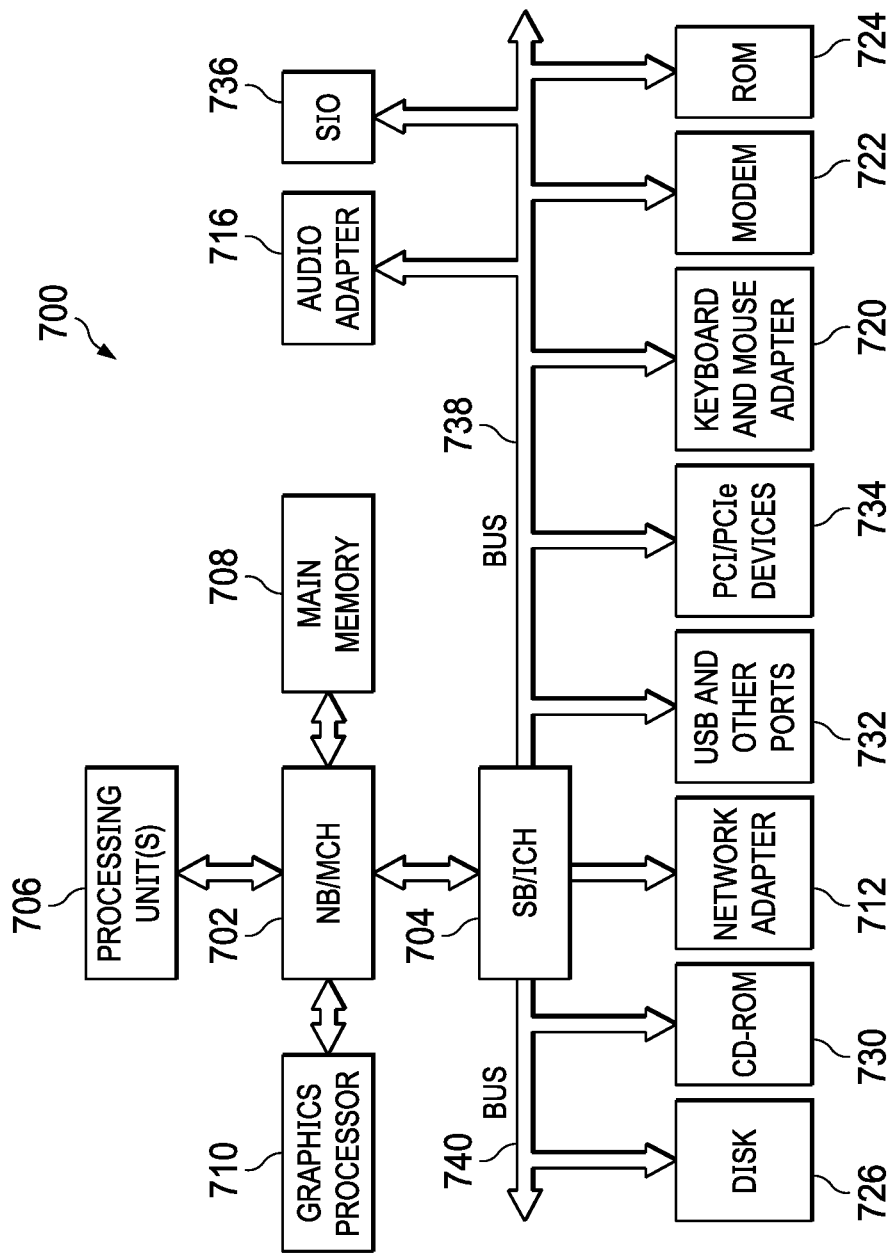
FIG. 7 is an example block diagram of a computing device in which aspects of the illustrative embodiments may be implemented.

It is apparent from the above description that the illustrative embodiments may be utilized in many different types of data processing environments. In order to provide a context for the description of the specific elements and functionality of the illustrative embodiments, FIGS. 6 and 7 are provided hereafter as example environments in which aspects of the illustrative embodiments may be implemented. It should be appreciated that FIGS. 6 and 7 are only examples and are not intended to assert or imply any limitation with regard to the environments in which aspects or embodiments of the present invention may be implemented. Many modifications to the depicted environments may be made without departing from the spirit and scope of the present invention.

FIG. 6 depicts a pictorial representation of an example distributed data processing system in which aspects of the illustrative embodiments may be implemented. Distributed data processing system 600 may include a network of computers in which aspects of the illustrative embodiments may be implemented. The distributed data processing system 600 contains at least one network 602, which is the medium used to provide communication links between various devices and computers connected together within distributed data processing system 600. The network 602 may include connections, such as wire, wireless communication links, or fiber optic cables.

In the depicted example, servers 604A-C and server 606 are connected to network 602 along with storage units 608. In addition, clients 610, 612, and 614 are also connected to network 602. These clients 610, 612, and 614 may be, for example, personal computers, network computers, or the like. In the depicted example, server 604 provides data accessible by the clients 610, 612, and 614 in order to render content on the clients 610-614 via one or more applications, an operating system, and the like, executing on the clients 610-614. Distributed data processing system 600 may include additional servers, clients, and other devices not shown, e.g., network routing or switching equipment, storage devices, and the like.

In the depicted example, distributed data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 600 may also be implemented to include a number of different types of networks, such as for example, an intranet, a local area network (LAN), a wide area network (WAN), or the like. As stated above, FIG. 6 is intended as an example, not as an architectural limitation for different embodiments of the present invention, and therefore, the particular elements shown in FIG. 6 should not be considered limiting with regard to the environments in which the illustrative embodiments of the present invention may be implemented.

As shown in FIG. 6, one or more of the computing devices, e.g., one or more of the servers 604A-604C, may be specifically configured to implement a SIEM system 620 in combination with one or more computing resources of a monitored computing environment 640, which may include one or more of the client computing devices 610-614, network appliances, storage devices, and the like, which may execute applications and the like, all of which may be considered computing resources, either physical or virtual in nature. In addition, one or more servers may be configured to implement an AIRTDS system 630 in accordance with one or more of the illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 604A-604C and/or 606, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, the implementation of the mechanisms of the illustrative embodiments improves the functionality of the computing device and provides a useful and concrete result that facilitates security alert image encoding and corresponding cognitive computing image recognition operations for predicting whether a security alert image representation represents a true threat or a false positive.

As shown in FIG. 6, one or more of the client devices 610-614 may be associated with the monitored computing environment 640 and may represent computing resources of the monitored computing environment 640. One or more computing devices of the monitored computing environment 640, e.g., one of the client devices 610-614, a server (not shown), or the like, may execute a security monitoring engine 642 which applies SIEM rules to security events occurring with regard to the computing resources of the monitored computing environment to determine if the security events potentially represent attacks/threats and if so, generates a security alert for further investigation by a security analyst. As mentioned above, known SIEM systems may generate many false positive alerts.

With the mechanisms of the illustrative embodiments, the security alerts generated by the SIEM system based on the application of the SIEM rules are further analyzed by the AIRTDS system 630, comprising the security alert image encoder 632 and the trained cognitive computing predictive model 634, to determine whether the security alert represents a true threat or is instead likely a false positive. As described previously, the security alert image encoder 632 applies a plurality of security alert attribute image encoding algorithms to the security alert attributes to convert them into image patterns comprising patterns of pixels in predefined sections or grids of an overall security alert image representation of the security alert. The security alert image representation is then input to the trained cognitive computing predictive model 634 for evaluation and classification as to whether or not the security alert represents an actual or true threat or is a false positive.

The classification output generated by the predictive model 634 may be returned to a security analyst associated with the SIEM system of the monitored environment 640 for presentation to the security analyst so that they are made aware of which security alerts warrant additional investigation and expenditure of resources to address potential security threats. The prediction outputs generated by the predictive model 634 may be output to the security analyst via a threat monitoring interface of the SIEM system, for example.

As noted above, the mechanisms of the illustrative embodiments utilize specifically configured computing devices, or data processing systems, to perform the operations of the AIRTDS system. These computing devices, or data processing systems, may comprise various hardware elements which are specifically configured, either through hardware configuration, software configuration, or a combination of hardware and software configuration, to implement one or more of the systems/subsystems described herein. FIG. 7 is a block diagram of just one example data processing system in which aspects of the illustrative embodiments may be implemented. Data processing system 700 is an example of a computer, such as server 604 in FIG. 6, in which computer usable code or instructions implementing the processes and aspects of the illustrative embodiments of the present invention may be located and/or executed so as to achieve the operation, output, and external effects of the illustrative embodiments as described herein.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 may be connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft® Windows10®. An object-oriented programming system, such as the Java™ programming system, may run in conjunction with the operating system and provides calls to the operating system from Java™ programs or applications executing on data processing system 700.

As a server, data processing system 700 may be, for example, an IBM eServer™ System P® computer system, Power™ processor based computer system, or the like, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

As mentioned above, in some illustrative embodiments the mechanisms of the illustrative embodiments may be implemented as application specific hardware, firmware, or the like, application software stored in a storage device, such as HDD 726 and loaded into memory, such as main memory 708, for executed by one or more hardware processors, such as processing unit 706, or the like. As such, the computing device shown in FIG. 7 becomes specifically configured to implement the mechanisms of the illustrative embodiments and specifically configured to perform the operations and generate the outputs described herein with regard to the SIEM rules management system.

Those of ordinary skill in the art will appreciate that the hardware in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions which are executed by the at least one processor and specifically configure the at least one processor to implement an image based event classification engine comprising an event image encoder and a first neural network computer model, wherein the method comprises:
   receiving, by the event image encoder, an event data structure comprising a plurality of event attributes, wherein the event data structure represents an event occurring in association with at least one computing resource in a monitored computing environment;
   executing, by the event image encoder, for each event attribute in the plurality of event attributes, a corresponding event attribute encoder that encodes the event attribute as a pixel pattern in a predetermined grid of pixels, corresponding to the event attribute, of an event image representation data structure;
   inputting, into the first neural network computer model, the event image representation data structure;
   processing, by the first neural network computer model, the event image representation data structure by applying one or more image feature extraction operations and image feature analysis algorithms to the event image representation data structure to generate a classification prediction output classifying the event into one of a plurality of predefined classifications; and
   outputting, by the first neural network computer model, a classification output indicating a prediction of one of the predefined classifications that applies to the event.

2. The method of claim 1, wherein the computing environment monitoring system is a security intelligence event monitoring system and wherein the event is an alert notification generated by the security intelligence event monitoring system.

3. The method of claim 1, wherein the event attribute encoder comprises one or more trained second neural network computer models trained to encode one or more of the event attributes in the plurality of event attributes into a corresponding pixel pattern in a corresponding predetermined grid of pixels.

4. The method of claim 1, wherein the first neural network computer model is trained via an unsupervised machine learning process to detect anomalies within the event image representation data structure.

5. The method of claim 1, wherein the event image encoder is deployed in an end user computing device of the monitored computing environment and the first neural network computer model is deployed in a server computing device outside the monitored computing environment, and wherein inputting the event image representation comprises transmitting the event image representation outside the monitored computing environment to the server computing device without outputting the event data structure outside the monitored computing environment.

6. The method of claim 1, wherein the event attributes comprise at least one of a customer identifier, a source address, a destination address, an event name, a triggering rule identification, or a duration, and wherein different event attribute encoders are executed on different types of event attributes.

7. The method of claim 1, wherein the plurality of predefined classifications comprise a true-threat classification indicating the event to represent an attack on the at least one computing resource, and a false-positive classification indicating that the event represents a falsely identified attack on the at least one computing resource.

8. The method of claim 1, wherein executing, for each event attribute in the plurality of event attributes, a corresponding event attribute encoder further comprises, for the event attribute:
   selecting a set of bits of the event attribute;
   converting the set of bits to a corresponding set of color properties for pixels in a corresponding pixel pattern; and
   applying a bitmask to bits of the event attribute to determine a location within a corresponding predetermined grid of pixels to place the pixels to generate a corresponding pixel pattern.

9. The method of claim 1, wherein the event image representation comprises a visual pattern discernable by the human eye but whose underlying meaning is not readily apparent to a human being without the processing, by the first neural network computing model, of the event image representation data structure to classify the event into one of the plurality of predefined classifications.

10. The method of claim 1, wherein the first neural network computing model comprises a pre-processing layer to perform image transformation operations to generate a pre-processed image, a feature detection layer that applies the one or more image feature extraction operations to detect and extract a set of features from the pre-processed image, a pooling layer which pools outputs of the feature detection layer into a smaller set of one or more feature arrays, a flattening layer that converts the one or more feature arrays generated by the pooling layer into a linear vector, one or more fully connected hidden layers which have trained non-linear functions of combinations of the features represented by the linear vector, and an output layer which outputs the classification output based on the outputs of the one or more fully connected hidden layers.

11. A computer program product comprising a computer readable storage medium having a computer readable program stored therein, wherein the computer readable program, when executed on a computing device, causes the computing device to implement an image based event classification engine comprising an event image encoder and a first neural network computer model, that operates to:
receive, by the event image encoder, an event data structure comprising a plurality of event attributes, wherein the event data structure represents an event occurring in association with at least one computing resource in a monitored computing environment;
execute, by the event image encoder, for each event attribute in the plurality of event attributes, a corresponding event attribute encoder that encodes the event attribute as a pixel pattern in a predetermined grid of pixels, corresponding to the event attribute, of an event image representation data structure;
input, into the first neural network computer model, the event image representation data structure;
process, by the first neural network computer model, the event image representation data structure by applying one or more image feature extraction operations and image feature analysis algorithms to the event image representation data structure to generate a classification prediction output classifying the event into one of a plurality of predefined classifications; and
output, by the first neural network computer model, a classification output indicating a prediction of one of the predefined classifications that applies to the event.

12. The computer program product of claim 11, wherein the computing environment monitoring system is a security intelligence event monitoring system and wherein the event is an alert notification generated by the security intelligence event monitoring system.

13. The computer program product of claim 11, wherein the event attribute encoder comprises one or more trained second neural network computer models trained to encode one or more of the event attributes in the plurality of event attributes into a corresponding pixel pattern in a corresponding predetermined grid of pixels.

14. The computer program product of claim 11, wherein the first neural network computer model is trained via an unsupervised machine learning process to detect anomalies within the event image representation data structure.

15. The computer program product of claim 11, wherein the event image encoder is deployed in an end user computing device of the monitored computing environment and the first neural network computer model is deployed in a server computing device outside the monitored computing environment, and wherein inputting the event image representation comprises transmitting the event image representation outside the monitored computing environment to the server computing device without outputting the event data structure outside the monitored computing environment.

16. The computer program product of claim 11, wherein the event attributes comprise at least one of a customer identifier, a source address, a destination address, an event name, a triggering rule identification, or a duration, and wherein different event attribute encoders are executed on different types of event attributes.

17. The computer program product of claim 11, wherein the plurality of predefined classifications comprise a true-threat classification indicating the event to represent an attack on the at least one computing resource, and a false-positive classification indicating that the event represents a falsely identified attack on the at least one computing resource.

18. The computer program product of claim 11, wherein the computer readable program further causes the computing device to execute, for each event attribute in the plurality of event attributes, a corresponding event attribute encoder at least by, for the event attribute:
selecting a set of bits of the event attribute;
converting the set of bits to a corresponding set of color properties for pixels in a corresponding pixel pattern; and
applying a bitmask to bits of the event attribute to determine a location within a corresponding predetermined grid of pixels to place the pixels to generate a corresponding pixel pattern.

19. The computer program product of claim 11, wherein the event image representation comprises a visual pattern discernable by the human eye but whose underlying meaning is not readily apparent to a human being without the processing, by the first neural network computing model, of the event image representation data structure to classify the event into one of the plurality of predefined classifications.

20. An apparatus comprising:
a processor; and
a memory coupled to the processor, wherein the memory comprises instructions which, when executed by the processor, cause the processor to implement an image based event classification engine comprising an event image encoder and a first neural network computer model, that operates to:
receive, by the event image encoder, an event data structure comprising a plurality of event attributes, wherein the event data structure represents an event occurring in association with at least one computing resource in a monitored computing environment;
execute, by the event image encoder, for each event attribute in the plurality of event attributes, a corresponding event attribute encoder that encodes the event attribute as a pixel pattern in a predetermined grid of pixels, corresponding to the event attribute, of an event image representation data structure;
input, into the first neural network computer model, the event image representation data structure;
process, by the first neural network computer model, the event image representation data structure by applying one or more image feature extraction operations and image feature analysis algorithms to the event image representation data structure to generate a classification prediction output classifying the event into one of a plurality of predefined classifications; and output, by the first neural network computer model, a classification output indicating a prediction of one of the predefined classifications that applies to the event.

* * * * *